UNITED STATES PATENT OFFICE.

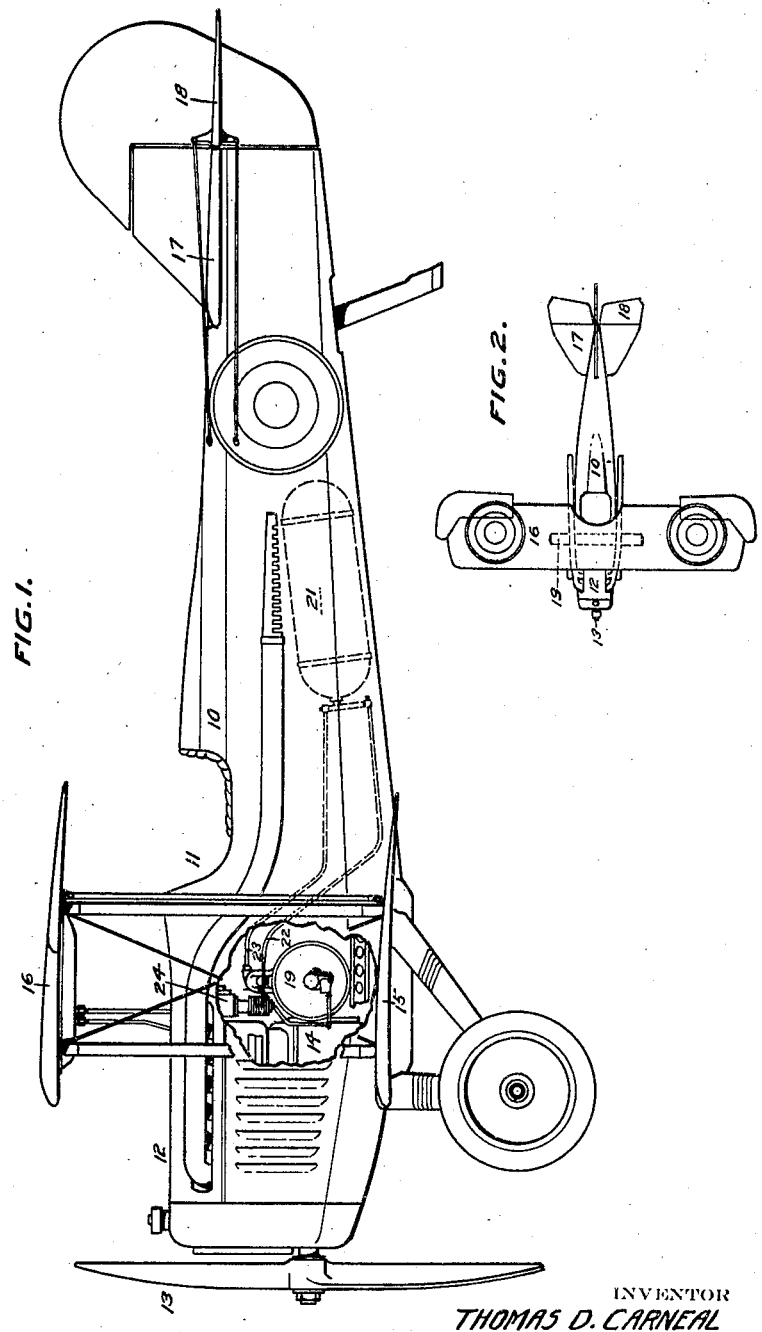

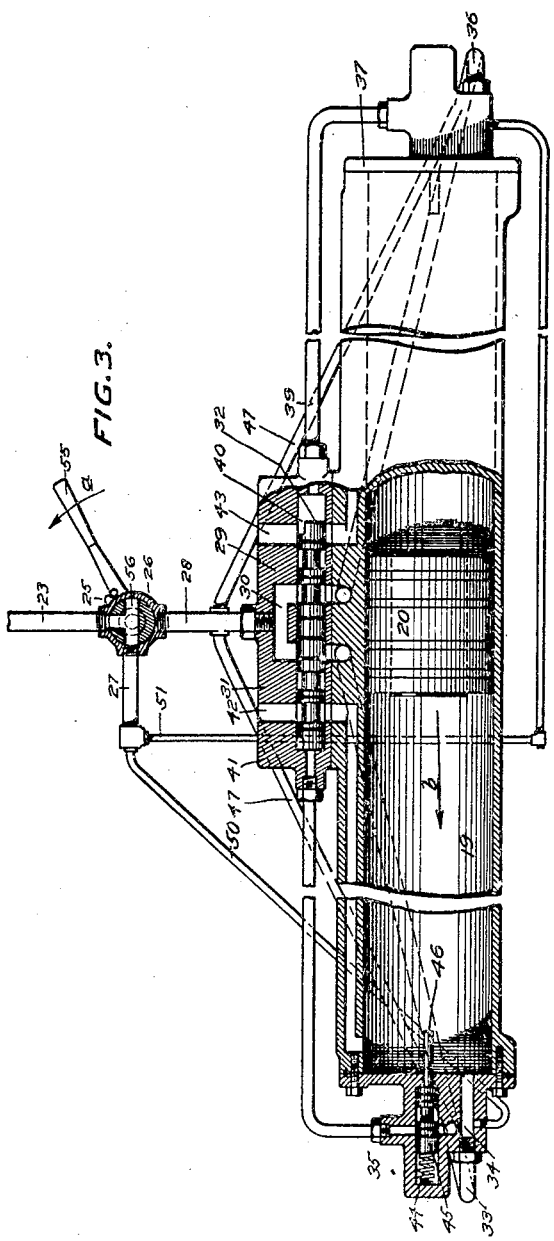

THOMAS D. CARNEAL, OF HIGHLAND SCHOOL DISTRICT, CALIFORNIA.

AEROPLANE CONSTRUCTION.

1,355,088.     Specification of Letters Patent.     Patented Oct. 5, 1920.

Application filed May 19, 1919. Serial No. 298,014.

*To all whom it may concern:*

Be it known that I, THOMAS D. CARNEAL, a citizen of the United States, residing at Highland School District, in the county of Contra Costa and State of California, have invented new and useful Improvements in Aeroplane Construction, of which the following is a specification.

This invention relates to improvements in aircraft construction and particularly pertains to means for producing a soaring action.

It is a matter of common knowledge that large birds cause their course to be changed to an upwardly direction without the stroke of their wings, the action being produced by a certain peculiar transfer of weight or center of gravity and accompanied by slight change in direction to the right and left as the soaring action takes place.

It is the principal object of the present invention to provide a device adapted to be mounted upon various types of aircraft and which will insure that a soaring action will take place without changing the relative position of the wings or the elevating planes.

A careful study of the flying maneuvers of large birds has led the inventor to believe that a soaring action is produced by transferring the center of gravity and thus throwing an excessive weight upon one wing by very rapid action, after which the center of gravity is restored to its normal position and may thereafter be thrown quickly to the opposite side.

It is assumed that this action will be analogous to the action produced in rowing a boat as the weight would be alternately placed upon the opposite wing tip and would tend to elevate the boat or the body of the aircraft, due to the fact that the action would be so sudden as to compress the air beneath the tip to which the weight was applied and thus act as a fulcrum point in lifting the body of the aircraft and accelerating its speed as the center of gravity is violently changed. With this general idea in view the present invention has been particularly concerned with means of and a method by which a weight could be rapidly shifted to either side of the center of gravity in the machine and would, in so moving cause the aircraft to have a soaring action.

The present invention contemplates the use of a cylinder mounted within a body or upon the frame of an aircraft and standing transversely thereon and in parallel alinement with the wings of the craft. Positioned within the cylinder is a slidable piston adapted to be operated by compressed air or any other such medium to move it from one end to the other of the cylinder and to thereby dispose a weight upon the opposite side to the center of gravity of the craft and cause the soaring action to take place.

The invention is illustrated, by way of example in the accompanying drawings in which;

Figure 1 is a view in side elevation showing the present invention as applied to a heavier than air machine, and with parts broken away to more clearly disclose the location of the device.

Fig. 2 is a view drawn upon a reduced scale and showing the position of the present invention as seen in plans.

Fig. 3 is an enlarged view in vertical section and elevation, with parts broken away to disclose the present invention and the valve mechanism by which it is controlled.

Referring to the drawing 10 indicates the fuselage of an aeroplane. This body portion of the aircraft is formed with a cockpit 11 and an engine cowl 12. At the front end of the cowl a propeller 13 is disposed and is adapted to be driven by an internal combustion engine 14. Parallel wings 15 and 16 extend outwardly from the opposite side of the fuselage and in superimposed relation to each other as indicated in Fig. 1. At the rear of the body portion of the machine is a horizontal stabilizer 17. This member is supplemented by an elevator 18 by which the course of travel of the aircraft is usually determined. From the foregoing description it will be understood that an aeroplane of common construction is used and that the present invention is not particularly concerned with the construction of aircraft, either of the heavier or lighter than air types, but with a device by which the aircraft may be caused to soar.

Reference being had to Fig. 3, it will be seen that an elongated cylinder 19 is provided and is disposed in a horizontal position. The position of this cylinder within the aircraft is particularly illustrated in dotted lines as shown in Fig. 2, where it will be seen to be directly between the wings and as nearly as possible in the transverse and longitudinal center of gravity of the machine, with its ends extending outwardly, equal distances from each side of the longitudinal center of the fuselage. This cylinder is of a single continuous bore and is adapted to accommodate a reciprocating piston member 20. Piston member 20 is intended to be of considerable weight and is designed to be shifted to either side of the cylinder and thus to either side of the longitudinal axis of the aircraft, which displacement will change the center of gravity and will produce the results desired. The movement of the piston 20 is produced by compressed air or other motive power and in the present instance where compressed air is used a supply tank 21 is provided. This tank is fitted with two lead lines 22 and 23. One of these lines leads to an air-compressor 24 driven by the engine 14 and the other leads to a multiple way valve 25. This valve has an outer casing 26 in which the pipe 23 is secured and which casing is also formed with openings to which pipes 27 and 28 are connected. The pipe 28 is in longitudinal alinement with the pipe 23 and leads downwardly to a piston valve cage 29. This cage is bolted upon the upper portion of the cylinder 19 and directly over the center thereof. In the center of the cage is a main air-chamber 30 which is U-shaped in section and has its two legs in register with separate ports 31 and 32. The port 31 is connected by pipe 33 to an inlet passageway 34 in the head 35 of the cylinder. The opposite port 32 is connected by a pipe 36 to the head 37 of the cylinder. A return pipe 38 connects the cylinder head 35 with the end of the valve cage 29 and a return pipe 39 connects the cylinder head 37 with the opposite end of the valve cage 29. The main portion of the pipes 38 and 39 are in longitudinal alinement and communicate with the opposite ends of a cylindrical piston bore 40 formed longitudinally of the cage 29 and continuing directly through the chamber 30. A multiple piston member 41 is reciprocably mounted within the bore 40 and when moved along this bore will alternately establish communication between the chamber 30 and the two ports 31 and 32. At the same time this piston member will alternately and oppositely establish communication between the outlet pipes 38 and 39 and the exhaust passages 42 and 43 respectively.

The pipes 38 and 39 which are connected to the opposite ends of the cylinder and to the heads 35 and 37, respectively, and communicate with piston bores 44, one of which is formed in each of the cylinder heads and both of which are in longitudinal alinement. These bores are intended to receive tappet valve members 46, which are formed with inwardly extending tappet rods adapted to be struck by the piston member 20 as it nears the opposite ends of its stroke. The bore 44 is also provided with inlet pipes 47 and 47, which communicate with the supply pipe 28 at the point above the cage 29, thus it will be seen that the tappet valve structures in the heads of the cylinders are at all times supplied with air, that is when the valve 25 is located to establish communication between the pipe 23 and the pipe 28.

In order that the piston 20 may be counter-balanced and held in its central position under normal conditions the pipe 27 is provided with two auxiliary supply pipes 50 and 51. These pipes lead to the opposite cylinder heads and communicate with the passages 34, one of which is formed in each of the heads. Through these passages the cylinder will have uninterrupted communication with the supply pipe 23 when the valve 25 is in the position shown in Fig. 3. This position, it will be understood is the normal inoperative position on the soaring device.

The air passing through the pipes 50 and 51, as well as the air delivered to the cylinders through the main supply 33 and 36 will pass out through the exhaust ducts 52. These ducts communicate with the passageways 42 and 43 in the cage, and are alternately closed by means of the piston member 32 slidable within the cage, as previously stated.

In operation of the present invention, it will be understood that the soaring device is mounted in the center of the machine as clearly shown in Figs. 1 and 2 of the drawing, and that the ordinary motive power of the aircraft will be used to attain an altitude which will be more free from varying air currents.

When during flight it is desired to attain greater altitude, the lever 55 is operated and moved in the direction of the arrow —a—, This will cause the transverse passageway 56 of the valve to register with the pipes 23 and 28 and will permit a free flow of air from the tank 21 to the compartment 30. When the valves are in the position shown in Fig. 3, the air will pass through the pipe 36 to the cylinder head 37 and will act within the cylinder against the piston member 20 to move it in the direction of the arrow —b—. As the piston reaches the end of its stroke, it will encounter the tappet rod 46 and will move the tappet valve 45 outwardly so that the cylindrical view around this member will permit communication between the inlet pipe 50 and the outlet pipe 38. Air will then pass through the pipe 38 to the end of the piston valve member 32 and will move it in the direction of the arrow —c—. This will reverse the communication of the chamber 30 from the pipe 36 to the pipe 33. When this action takes place air will be delivered to the cylinder and against the piston which is now outstanding at one end of the cylinder. When the air is thus delivered the piston will be forced to the opposite end of the cylinder and as long as the valve 25 is in the position with its passageway 56 producing communication between the pipes 23 and 28 the piston will violently reciprocate from one end to the other of the cylinder. This rapid displacement of weight is intended to cause a corresponding change or shifting of the center of gravity of the machine in a manner identical to that employed by soaring birds and will allow the operator to take advantage of the increased speed attained to change his horizontal line of flight to a pronounced "zoom" or a series of short climbing turns thereby increasing his altitude. When the operation is to be continued the valve 25 is moved to the position shown in Fig. 3 and at this time air will pass from the pipe 23 to the two pipes 50 and 51, and will thereby force the piston 20 to its central position, where it will be held by the constant equal pressure of the air against its opposite ends.

It will thus be seen that the device here disclosed will act to rapidly transfer the center of gravity of the machine as desired with the results previously explained, the action being simple and direct.

It will be understood that the device here disclosed is merely shown by way of example and that it will be within the spirit of the present invention to use any other structure which may be found convenient for transferring the weight or a weight transversely of an aircraft so that the center of gravity may be changed and a load rapidly disposed upon one of the wings of the structure to produce the soaring action desired, and while I have shown the preferred form of my invention, it will be understood that various changes in the combination, construction and arrangement of parts may be made by those skilled in the art without departing from the spirit of the invention as shown.

Having thus described my invention, what I claim and desire to secure by Letters Patent, is:

1. A soaring device for aircraft comprising controllable means for alternately and intermittently displacing the center of gravity of the aircraft to either side of its longitudinal center.

2. A method of producing a soaring action in air craft to assist the ascension thereof which consists in alternately changing the center of gravity of the machine from one side to the other.

3. A soaring device for aircraft comprising a cylinder extending in parallel relation to the wings of an aircraft machine and carrying a weighted piston and controllable means for causing the piston to reciprocate from one end to the other of said cylinder and to thus transfer the center of gravity of the machine.

4. The combination in an aeroplane fuselage and planes, of a cylinder disposed transversely of the center of gravity, a weighted piston movable in the cylinder, a compressed air tank, a valve chamber and a valve movable therein, pipes from said chamber to the cylinder ends, and means admitting air from the tank, and means controlling its admission to the valve chambers and to either end of the cylinder.

5. The combination with an aeroplane fuselage and planes, of a transversely disposed cylinder at the center of gravity, a weighted piston movable within the cylinder, a compressed air tank, pipes leading therefrom toward the center of the cylinder, a valve in said pipe and a controlling lever therefor, a valve chamber with slidable valves interposed between the admission valve and the cylinder, and pipes leading from said valve chamber to the ends of the cylinder, to impel the piston in either direction.

6. The combination with an aeroplane fuselage of a transversely disposed cylinder having a heavy piston movable across the center of gravity of the apparatus, a compressed air tank and valves and connections to admit and control the flow of air to and from the cylinder, spring primed tappet rods extending into the cylinder ends and piston valves movable with the tappets, and pipes connecting said valve cages with the cylinder ends and with an exhaust.

In testimony whereof I have hereunto set my hand in the presence of two subscribing witnesses.

THOMAS D. CARNEAL.

Witnesses:
E. N. WALTER,
M. G. CALLAGHAN.